(12) United States Patent
Yi et al.

(10) Patent No.: US 12,194,694 B2
(45) Date of Patent: Jan. 14, 2025

(54) EX-SITU PREPARATION METHOD FOR LIQUID MOLDING COMPOSITE MATERIAL

(71) Applicants: NINGBO NOTTINGHAM NEW MATERIALS INSTITUTE CO., LTD., Zhejiang (CN); THE UNIVERSITY OF NOTTINGHAM NINGBO CHINA, Zhejiang (CN); BEIJING MEGA MATERIAL INNOVATION WORK (M2IW) CO., LTD., Beijing (CN)

(72) Inventors: Xiaosu Yi, Zhejiang (CN); Chris Rudd, Zhejiang (CN); Xiaoling Liu, Zhejiang (CN); Yongmin Xiao, Beijing (CN); Xiaoye Cong, Zhejiang (CN); Chenkai Zhu, Zhejiang (CN); Qinghua Liao, Beijing (CN); Xuegang Ma, Beijing (CN)

(73) Assignees: NINGBOW NOTTINGHAM NEW MATERIALS INSTITUTE CO., LTD. (CN); THE UNIVERSITY OF NOTTINGHAM NINGBOW CHINA (CN); BEIJING MEGA MATERIAL INNOVATION WORK (M2IW) CO., LTD. (CN)

( * ) Notice: Subject to any disclaimer, the term of this patent is extended or adjusted under 35 U.S.C. 154(b) by 1073 days.

(21) Appl. No.: 16/972,761

(22) PCT Filed: Jun. 8, 2018

(86) PCT No.: PCT/CN2018/090391
§ 371 (c)(1),
(2) Date: Dec. 7, 2020

(87) PCT Pub. No.: WO2019/232777
PCT Pub. Date: Dec. 12, 2019

(65) Prior Publication Data
US 2021/0237375 A1 Aug. 5, 2021

(51) Int. Cl.
*B29C 70/48* (2006.01)
*B29C 70/10* (2006.01)
(Continued)

(52) U.S. Cl.
CPC ............ *B29C 70/48* (2013.01); *B29C 70/10* (2013.01); *B29C 70/546* (2013.01); *C08J 5/249* (2021.05);
(Continued)

(58) Field of Classification Search
None
See application file for complete search history.

(56) References Cited

U.S. PATENT DOCUMENTS

| 3,720,562 A * | 3/1973 | Drelich | D04H 1/66 524/424 |
| 3,784,647 A * | 1/1974 | Fleming | C08G 59/72 525/481 |
| 2016/0046111 A1 * | 2/2016 | Troughton, Jr. | C08L 23/16 156/332 |

OTHER PUBLICATIONS

Hexion Specialty Chemicals, EPON Resin 828 Technical Data Bulletin, Sep. 2005. (Year: 2005).*

(Continued)

*Primary Examiner* — S. Behrooz Ghorishi
*Assistant Examiner* — Gregory C. Grosso
(74) *Attorney, Agent, or Firm* — McAndrews, Held & Malloy, Ltd.

(57) ABSTRACT

Embodiments of the present disclosure provide an ex-situ preparation method for a composite molded body. The preparation method comprises: providing a porous support, a first component, and a second liquid component; contacting the first component with the porous support; contacting the second liquid component with the first component and/or the porous support, in which process the first component and the second liquid component do not undergo a chemical reaction, and the second liquid component remains in a liquid state; and treating the first component and the second liquid component such that the first component and the second liquid component undergo a chemical reaction to become a solid, or undergo phase transformation toughening and solidification molding. The present disclosure discloses an advanced composite material manufacturing technology, and relates to a low-cost and easy-to-operate ex-situ liquid molding preparation method. In the method, core reaction components are separated spatially, and two sub-processes of physical flow and chemical reaction are separated chrono-
(Continued)

logically, thereby greatly simplifying the liquid molding technique. The "ex-situ" preparation method is applicable to liquid molding manufacture of thermosetting resins, liquid molding and toughening of thermosetting composite materials, and liquid molding manufacture of thermoplastic composite materials. By means of the "ex-situ" liquid molding, some resin materials originally unsuitable for liquid molding can be modified into liquid-moldable materials, thereby expanding the options and types of resin materials for liquid molding.

4 Claims, 1 Drawing Sheet

(51) Int. Cl.
　　　*B29C 70/54*　　　(2006.01)
　　　*C08J 5/24*　　　(2006.01)
　　　*B29K 33/00*　　　(2006.01)
　　　*B29K 63/00*　　　(2006.01)
　　　*B29K 79/00*　　　(2006.01)
　　　*C08K 5/14*　　　(2006.01)
(52) U.S. Cl.
　　　CPC ...... *B29K 2033/08* (2013.01); *B29K 2063/00* (2013.01); *B29K 2079/085* (2013.01); *C08J 2333/10* (2013.01); *C08J 2363/00* (2013.01); *C08J 2379/08* (2013.01); *C08K 5/14* (2013.01)

(56) References Cited

OTHER PUBLICATIONS

Yi; Xiaosu, "Machine-translation to Engish of WO2008011765A1, with full foreign patent document attached", B32B27/06, Jan. 31, 2008. (Year: 2008).*

Yi; Xiaosu, "Machine-translation to Engish of WO2008011765A1, with full foreign patent document attached", B32B27/06, Jan. 31, 2008. (Year: 2008) (See NPL document filed on May 31, 2024).*

* cited by examiner

EX-SITU PREPARATION METHOD FOR LIQUID MOLDING COMPOSITE MATERIAL

The application is a U.S. National Phase Entry of International Application No. PCT/CN2018/090391 filed on Jun. 8, 2018, designating the United States of America. The present application claims the benefit of the above-identified application which is hereby incorporated by reference herein in its entirety.

TECHNICAL FIELD

The embodiments of the present disclosure relate to an ex-situ preparation method of a liquid-molded composite material.

BACKGROUND

High performance and low cost have become the main direction of composite material technology development, in which liquid molding technology represented by Vacuum Assistant Resin Infusion (VARI) and Resin Transfer Molding (RTM) is the mainstream of current development.

In the field of aviation composite material technology, due to the large size and area of aircraft parts such as wings and fuselages, and the high manufacturing precision of aircraft parts, the processes of prefabrication and liquid molding of composite materials are complex, so that the process control and defect control of such composite parts are very difficult. In addition, parts made of composite materials for aircraft usually require very high toughness. Therefore, the current liquid molding method is difficult to meet the technical requirements of aircraft parts, and the performance level of its parts is also far lower than that of the current prepreg/autoclave composite parts. There is an urgent need to develop a new type of liquid molding technology for composite materials.

SUMMARY

The embodiments of the present disclosure relate to an ex-situ preparation method of a liquid-molded composite material. The preparation method has relatively simple process control and low cost, and expands the options and types of resin materials for liquid molding.

At least one embodiment of the present disclosure provides an ex-situ preparation method of a liquid-molded composite material, comprising: providing a porous support, a first component and a second liquid component; contacting the first component with the porous support; contacting the second liquid component with the first component and/or the porous support, in which process the first component and the second liquid component do not undergo a chemical reaction, and the second liquid component remains in a liquid state; and treating the first component and the second liquid component such that the first component and the second liquid component undergo a chemical reaction to become a solid, or undergo phase transformation toughening and solidification molding.

For example, in the ex-situ preparation method provided by at least one embodiment of the present disclosure, the first component is formed on the surface of the porous support in a dispersed form.

For example, in the ex-situ preparation method provided by at least one embodiment of the present disclosure, the porous support includes carbon fiber, glass fiber, aramid fiber, basalt fiber, or a blend of the foregoing fibers; or the porous support includes unidirectional fabric, plain fabric, satin fabric, twill fabric, non-weft fabric, non-woven fabric, or non-crimp fabric.

For example, in the ex-situ preparation method provided by at least one embodiment of the present disclosure, the method of contacting the first component with the porous support includes: prefabricating the first component on the porous support by dry spraying, spray coating, or wet impregnating; or prefabricating the first component on the porous support by relief printing, screen printing, transfer printing, or 2D printing.

For example, in the ex-situ preparation method provided by at least one embodiment of the present disclosure, graphics printed by the relief printing, the screen printing, the transfer printing, or the 2D printing include: regular or irregular patterns formed by dots, lines and/or mottles, which are preformed on the surface of the porous support and do not block the pores in the porous support.

For example, in the ex-situ preparation method provided by at least one embodiment of the present disclosure, the initiation method for the chemical reaction of the first component with the second liquid component to become a solid includes at least one of heating treatment and irradiating treatment.

For example, in the ex-situ preparation method provided by at least one embodiment of the present disclosure, the first component includes at least one of a curing agent, a toughening agent, a promoter, and an initiator, and the second liquid component is a thermosetting resin or a thermoplastic resin.

For example, in the ex-situ preparation method provided by at least one embodiment of the present disclosure, the thermosetting resin includes at least one of epoxy resin, bismaleimide resin, thermosetting polyimide resin, polybenzoxazine resin, phenolic resin, cyanate ester resin, and unsaturated polyester resin.

For example, in the ex-situ preparation method provided by at least one embodiment of the present disclosure, the epoxy resin includes at least one of bisphenol A epoxy resin, bisphenol F epoxy resin, and N,N'-tetraglycidyl-methylenedianiline epoxy resin; the bismaleimide resin includes: at least one of 4,4'-bismaleimidodiphenylmethane, 4,4'-bismaleimidodiphenyl ether, 4,4'-bismaleimidodiphenyl sulfone, N,N'-m-phenylenebismaleimide, N,N'-(4-methyl-1,3-phenylene)bismaleimide, and 2,2'-bis [4-(maleimidophenoxy)phenyl]propane.

For example, in the ex-situ preparation method provided by at least one embodiment of the present disclosure, the thermoplastic resin includes methyl acrylate.

For example, in the ex-situ preparation method provided by at least one embodiment of the present disclosure, the mass ratio of the first component to the second liquid component is from 2 to 50.

For example, in the ex-situ preparation method provided by at least one embodiment of the present disclosure, the toughening agent includes at least one of polyetherketone, polysulfone, polyethersulfone, thermoplastic polyimide, polyetherimide, polycarbonate, polyphenylene ether, and polyamide.

For example, in the ex-situ preparation method provided by at least one embodiment of the present disclosure, the curing agent includes diaminodiphenyl sulfone and rosin-based acid anhydride.

For example, in the ex-situ preparation method provided by at least one embodiment of the present disclosure, the promoter is a complex of boron trichloride and triethylamine.

For example, in the ex-situ preparation method provided by at least one embodiment of the present disclosure, the initiator includes benzoyl peroxide.

For example, in the ex-situ preparation method provided by at least one embodiment of the present disclosure, the diaminodiphenyl sulfone (DDS) as a curing agent is dissolved in methyl ethyl ketone (MEK) to form the first component, and the first component is contacted with the porous support that is a reinforced fabric, and air-dried to form a fabric preform loaded with DDS;

multiple layers of the fabric preform loaded with DDS are placed into a mold to make a preform laminate board while ensuring the porous characteristic of the preform laminate board;

then, in the physical flow filling stage, the epoxy resin formed by blending bisphenol A epoxy (DGEBA) and N,N'-tetraglycidyl-methylenedianiline epoxy (TGMDA) is used as the second liquid component and injected into the mold, wherein the injection temperature of the second liquid component is controlled to be 60° C., the injection pressure of the second liquid component is controlled to be 0.1 MPa, and the mold filling time of the second liquid component is controlled to be 2-3 hours, so as to ensure that the first component is not chemically reacted with the second liquid component;

finally, the above porous support loaded with DDS and fully impregnated with liquid DGEBA and TGMDA is heated to 180° C. at 0.5-0.7° C./min, and kept for 2 hours, in which process, DDS in the first component is dissolved by DGEBA and TGMDA in the second liquid component, and at the same time, a chemical crosslinking reaction occurs to form a fiber-reinforced liquid-molded epoxy resin solid composite product.

For example, in the ex-situ preparation method provided by at least one embodiment of the present disclosure, the porous support is a fiber-reinforced fabric, and the second liquid component is diallyl bisphenol A (DABPA); N,N'-m-phenylenebismaleimide (PDM) is dispersed in N,N'-dimethylacetamide (DMAC), and stirred to form a uniform PDM solution, which is used as the first component; the first component is uniformly loaded on the porous support, and air-dried to form a fabric preform preformed with PDM; multiple layers of the fabric preform preformed with PDM are placed into an RTM mold to form a preform board, and the preform board is a porous preform board; the second liquid component is injected into the preform board, wherein the injection temperature of the second liquid component is controlled to be 60° C., the injection pressure of the second liquid component is controlled to be 0.1 MPa, and the mold filling time of the second liquid component is controlled to be 2-3 hours, so as to ensure that the first component and the second liquid component do not undergo a chemical reaction during the physical flow filling stage; and finally, the preparation enters the chemical reaction curing stage, in which the above fiber support preform loaded with PDM and fully impregnated with liquid DABPA is heated to 150° C.-200° C. at a heating rate of 1-3° C./min so that PDM in the first component is dissolved and diffused by DABPA in the second liquid component, and at the same time, a chemical reaction occurs to form a fiber-reinforced liquid-molded bismaleimide solid composite product.

For example, in the ex-situ preparation method provided by at least one embodiment of the present disclosure, the porous support is a reinforced fabric, and an epoxy resin formed by blending bisphenol A epoxy (DGEBA) and N,N'-tetraglycidyl-methylenedianiline epoxy (TGMDA) is used as the second liquid component; diaminodiphenyl sulfone (DDS) as a curing agent is dissolved in methyl ethyl ketone (MEK) to form the first component; the first component is contacted with the porous support, and air-dried to form a fabric preform loaded with DDS; multiple layers of the fabric preform loaded with DDS are placed into a mold to make a preform laminate board, while ensuring the porous characteristic of the preform laminate board; then, in the physical flow filling stage, the second liquid component is injected into the mold, wherein the injection temperature of the second liquid component is controlled to be 60° C., the injection pressure of the second liquid component is controlled to be 0.1 MPa, and the mold filling time of the second liquid component is controlled to be 2-3 hours, so as to ensure that the first component is not chemically reacted with the second liquid component; and finally, the above porous support loaded with DDS and fully impregnated with liquid DGEBA and TGMDA is heated to 180° C. at 0.5-0.7° C./min, and kept for 2 hours, in which process, DDS in the first component is dissolved byDGEBA and TGMDA in the second liquid component, and at the same time, a chemical crosslinking reaction occurs to form a fiber-reinforced liquid-molded epoxy resin solid composite product.

For example, in the ex-situ preparation method provided by at least one embodiment of the present disclosure, the porous support is a reinforced fabric, and a rosin-based acid anhydride as a curing agent and a boron trichloride triethylamine as a promoter are mixed and dissolved in an acetone solvent to form the first component; a mixed epoxy resin of E51 and bisphenol F is used as the second liquid component; the first component is contacted with the porous support and air-dried to form a fabric preform loaded with the first component; multiple layers of the preform are placed into a mold, while maintaining the porous characteristic of the preform; then, in the physically filling stage, the second liquid component is injected into the mold under the following conditions: the temperature of the mold and the glue injection system is 80° C., and the glue injection time is 30-40 min, so as to ensure that the chemical cross-linking reaction of the first component with the second liquid component during the liquid glue injection process is avoided; and finally, in the chemical reaction curing stage, the above preform loaded with the rosin acid anhydride as a curing agent and the boron trichloride triethylamine as a promoter and fully impregnated with liquid epoxy is subjected to a step-by-step heating treatment: heated to 100° C. and kept for 2 hours, then heated to 125° C. and kept for 1 hour, and then heated to 160° C. and kept for 1 hour, wherein the heating rate is 0.5-0.7° C./min; in this way, a fiber-reinforced liquid-molded epoxy resin solid composite product with a high glass transition temperature and high performance is obtained.

For example, in the ex-situ preparation method provided by at least one embodiment of the present disclosure, thermoplastic polyaryletherketone (PEK-C) is dissolved in tetrahydrofuran (THF) to form a solution as the first component (functional component), and the porous support is a reinforced fabric, and E54 epoxy resin is used as the second liquid component; the first component is printed on the porous support to form regular spots; multiple layers of the fabric preform loaded with PEK-C are placed into a mold while ensuring the porous characteristic of the fabric preform; then, in the physical filling stage, the second liquid component is injected into the mold, wherein the glue injection temperature is controlled to be 60° C., the injection pressure is controlled to be 0.1 MPa, and the mold filling time is controlled to be 2-3 hours, so as to ensure that the second liquid component cannot dissolve the first component; finally, in the curing stage, the above porous support loaded with the PEK-C and fully impregnated with liquid E54 epoxy resin is heated to 180° C. and kept for 2 hour, wherein the heating rate is 0.5-0.7° C./min; at this time, the first component is dissolved by the second liquid component, i.e., E54 epoxy resin, and at the same time, PEK-C is reacted in the E54 epoxy resin to induce spinodal phase separation, thereby forming a thermoplastic-thermosetting bi-continuous toughened structure between layers of the composite material, and finally obtaining a fiber-reinforced liquid-molded and toughened composite material as a solid.

For example, in the ex-situ preparation method provided by at least one embodiment of the present disclosure, benzoyl peroxide (BPO) is dissolved in a solvent to form the first component, and the porous support is a reinforced fabric support, and thermoplastic methyl acrylate (MMA) resin is used as the second liquid component; the first component is contacted with the porous support and air-dried to form a fabric preform; multiple layers of the fabric preform loaded with BPO are placed into a mold to form a preform laminate board while ensuring the porous characteristic of the preform laminate board; then, in the flow filling stage, the second liquid component is injected into the mold, wherein the glue injection temperature is controlled to be 25° C.-30° C., and within this temperature range, the first component and the second liquid component do not undergo a chemical reaction; and finally, in the chemical reaction stage, the above porous support loaded with BPO and fully impregnated with liquid MMA is heated to 80° C. and kept for 1 hour, wherein the heating rate is 0.5-0.7° C./min; at this time, the first component BPO is dissolved by the second liquid component MMA, and the polymerization reaction of MMA occurs to form a fiber-reinforced, liquid-molded thermoplastic composite material as a solid.

DETAILED DESCRIPTION OF THE EMBODIMENTS

In order to make the objectives, technical solutions, and advantages of embodiments of the present disclosure clearer, the technical solutions of the embodiments of the present disclosure will be described clearly and completely in conjunction with the accompanying drawings of the embodiments of the present disclosure. Apparently, the described embodiments are part of the embodiments of the present disclosure, rather than all of the embodiments. Based on the described embodiments of the present disclosure, all other embodiments obtained by a person of ordinary skill in the art without creative work shall fall within the protection scope of the present disclosure.

Unless otherwise defined, the technical or scientific terms used in the present disclosure shall have the usual meanings understood by those with ordinary skills in the field to which the present disclosure belongs. The "first", "second" and similar words used in the present disclosure do not indicate any order, quantity, or importance, but are only used to distinguish different components. "Include", "comprise", or other similar words mean that the elements or objects appearing in front of the word cover the elements or objects listed after the word and their equivalents, without excluding other elements or objects. "Up", "down", etc. are only used to indicate a relative position relationship, which may change accordingly after the absolute position of the described object is changed.

In the process of liquid molding, the low viscosity of the matrix resin is very important to the process of fiber interface infiltration, overall filling and infiltration of the preform, gas discharge and mold filling, and the low viscosity property of the matrix resin is required to not change with the time (open period of liquid molding) and space (size and shape of the part) of the matrix resin flow. The requirement of low viscosity property makes the liquid molding technology quite demanding on the choice of matrix resin materials. For example, thermoplastic polymer resins with high viscosity cannot be used in liquid molding technology. In addition, the flexibility of the cured composite material needs to be as high as possible. Therefore, not all resin materials with high performance are suitable for liquid molding technology.

Moreover, matrix resins with low viscosity are usually brittle after being cured, and difficult to be toughened by adding polymer materials later. Therefore, the contradiction between the low viscosity of the matrix resin and the flexibility of the composite material in the liquid molding technology has become the focus of research and attention by those skilled in the art.

As far as the process characteristics of liquid molding are concerned, there are two coexisted sub-processes in the liquid molding process, namely, the physical process characterized by flow, infiltration, and mold filling, and the chemical reaction process or phase transformation toughening process in which a liquid resin with low viscosity is transformed into a solid material. In the physical process, the liquid matrix resin is injected into the molding mold under certain temperature and pressure conditions. The matrix resin injected into the molding mold infiltrates, impregnates and soaks the fiber preform in a dry state, and the gas in the preform is exhausted under vacuum condition. In the chemical reaction process or the phase transformation process, the filled matrix resin completes a curing reaction or a consolidation process in the mold under a certain temperature or irradiation condition, thereby obtaining the liquid-molded solid composite material as the final product.

However, because the physical flow process and the chemical reaction process or the phase transformation process coexist in time and space and interact with each other, and the viscosity of the matrix resin will increase with the flow time and the flow distance, a series of intrinsic process problems arise: (1) the flow of matrix resin becomes more and more difficult over time, especially for large and high-performance composite parts with high fiber volume fraction; (2) the increase in the viscosity of the matrix resin will cause difficulties in infiltration and impregnation, and the increase process of the viscosity of the matrix resin is difficult to be controlled; and (3) the increase in the viscosity of the matrix resin will also cause defects such as "looseness" and "dry spots" in the final solid product, thereby increasing the production cost. Based on the above process problems, those skilled in the art have to find a balance between the process characteristics of liquid molding technology and the quality and performance of composite products.

Generally, the toughness of thermosetting composite material can be improved by adding a toughener, but these methods are all at the expense of the initial viscosity and fluidity of the matrix resin, that is, they will increase the viscosity of the matrix resin, thereby impairing the processability of liquid molding. For example, rubber or a thermoplastic resin is usually added to the thermosetting resin to improve the toughness of the thermosetting composite material, thereby forming a phase-separated structure to improve the overall flexibility of the composite material. Therefore, this toughening technology is "in-situ", and is a toughening technology that is "integrated" in space, that is, it occurs uniformly at any space position in the entire system. Apparently, it is this integral toughening treatment that causes the viscosity of the matrix resin to be increased sharply, and the liquid molding process cannot be realized. In addition, the choice of toughening agent should be considered to match the matrix resin, because the toughening agent will change the process conditions of the matrix resin and affect the stiffness and modulus of the matrix resin.

In this regard, the inventors of the present disclosure propose a method for preparing an "ex-situ" liquid-molded composite material molded body. The essence of the preparation method is that: first, by loading one of the core reaction components, that is, the first loaded component onto the porous support, two reaction components are separated or the matrix component and the functional component are separated in space, while maintaining the porous characteristic of the support; then, in chronological order, the second liquid component with low viscosity is allowed to flow into the preform formed by the support loaded with the first component, thereby realizing the interface infiltration, structural impregnation, gas discharge and mold filling of the second liquid component in the preform (the first component is controlled not to chemically react with the second liquid component at this time); and after the physical flow, the impregnation and the mold filling processes are over, the chemical reaction is started. In this way, the liquid molding process is decomposed into two separate stages, i.e., physical flow and chemical reaction, so that the liquid molding preparation of composite materials and the liquid molding toughening of high-performance thermosetting composite materials are simply and conveniently realized.

Figure 1:
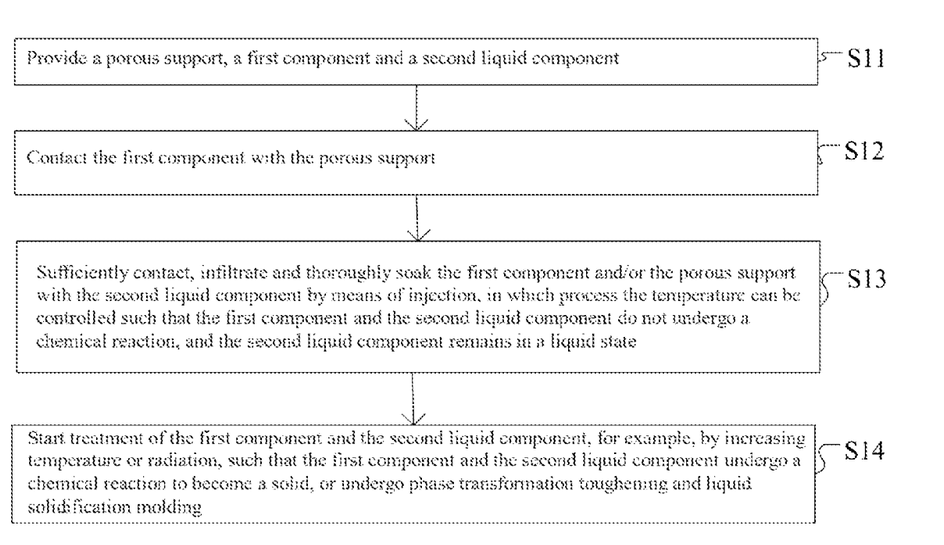
FIG. 1 is a flowchart of an ex-situ preparation method of a liquid-molded composite material provided by an embodiment of the disclosure.

At least one embodiment of the present disclosure provides an ex-situ preparation method for liquid molding of composite materials. For example, FIG. 1 is a flow chart of an ex-situ preparation method for liquid molding composite materials provided by an embodiment of the present disclosure. As shown in FIG. 1, the preparation method includes the following steps:

S11: providing a porous support, a first component, and a second liquid component;

S12: contacting the first component with the porous support;

S13: in the physical flow filling stage, fully contacting, infiltrating and impregnating the first component and/or the porous support with the second liquid component by glue injection; in which process, the first component can be prevented from chemically reacting with the second liquid component by controlling the temperature, and the second liquid component remains in a liquid state;

S14: in the chemical reaction stage or in the phase transformation toughening and solidification stage, initiating the treatment of the first component and the second liquid component, for example, by heating or irradiating such that the first component and the second liquid component undergo a chemical reaction to become a solid, or undergo phase transformation toughening and liquid solidification molding.

For example, in the ex-situ preparation method provided by at least one embodiment of the present disclosure, the mass ratio of the first component to the second liquid component is from 2 to 50, for example, the mass ratio of the first component to the second liquid component is 2, 8, 10, 16, 20, 30, 40, or 50.

The embodiments of the present disclosure are directed to two-component or multi-component resin material systems. It should be noted that, the first component is the first loaded component; the first loaded component may be a single-ingredient compound or a mixture of multiple components; and the first loaded component may be powdered or liquid. For example, the first loaded component may be a reactant only, or a mixture of a reactant and a catalyst, or a mixture of a reactant and a modifier such as a curing agent, a toughening agent, and a promoter as long as it can be preformed on a support and subsequently undergo a chemical reaction with the second liquid component, or undergo phase transformation toughening and solidification molding.

For example, the first component is formed on the surface of the porous support in a dispersed form. For example, the dispersed form means that particles with the largest dimension of 0.01-5.0 microns are uniformly and discontinuously formed on the surface of the porous support without blocking the pores in the porous support, that is, the property of porous channels of the porous support is maintained.

For example, the powdered first loaded component can be formed on the porous support by dry spraying, spray coating, etc., but the porous support after loading should still have the characteristics of being loose, porous and flexible, and have enough voids to ensure that the second liquid component can flow and infiltrate and impregnate the porous support during the mold filling process; it is also possible to disperse the powdered first loaded component in a solvent to form a liquid first loaded component, and transfer the liquid first loaded component onto the porous support by wet impregnation, and then air-dry the liquid first loaded component to prepare a porous support preform loaded with the first loaded component.

For example, the method of contacting the first component with the porous support may also be to prefabricate the first component on the porous support by means of relief printing, screen printing, transfer printing, or 2D printing.

For example, graphics printed by relief printing, screen printing, transfer printing, or 2D printing include: regular or irregular patterns formed by dots, lines and/or mottles, which are preformed on the surface of the porous support without blocking the pores in the porous support. Therefore, the liquid molding process of the preform is not affected.

For example, when the second liquid component flows onto the porous support loaded with the first loaded component, it will fully contact, infiltrate and impregnate the first loaded component. However, by controlling the process conditions such as the temperature, the chemical reaction between the first loaded component and the second liquid component can be basically prevented during the physical flow filling stage.

For example, the first loaded component is a curing agent for a thermosetting resin, and the second liquid component is the thermosetting resin.

For example, the porous support includes carbon fiber, glass fiber, aramid fiber, basalt fiber, or a blend of the foregoing fibers; or the porous support includes unidirectional fabric, plain fabric, satin fabric, twill fabric, non-weft fabric, non-woven fabric, or non-crimp fabric. In view of high-performance application of a composite material, the embodiments of the present disclosure mainly use carbon fiber materials.

For example, if the porous support is a carbon fiber fabric, the porosity of the fabric can be greater than 50%, the area density is from 4 g/m² to 1220 g/m², and the thickness is from 10 μm to 1000 μm.

For example, an embodiment of the present disclosure places multiple layers of fabrics in a mold. By taking advantage of the flow and impregnation of liquid in the interlayer medium, this eliminates the use of a flexible resin flow distributor in vacuum assisted molding, increases the permeability and the penetration uniformity of the preformed fabric structure, increases the process effect of liquid molding and the manufacturing quality of composite materials, shortens the preparation time, reduces the manufacturing cost, and realizes the combination of multi-function, integration and low-cost.

For example, after the first component is fully contacted, infiltrated, and impregnated with the second liquid component, the first component and the second liquid component are subjected to a treatment which includes heating the first component and the second liquid component to initiate a chemical reaction to form a solid product.

For example, the first component and the second liquid component can also be treated by irradiation, such as electron beam irradiation, ultraviolet radiation, or infrared radiation, etc., so that the first component and the second liquid component are cured by a chemical reaction under irradiation condition.

For example, the liquid molding process of composite materials requires the second liquid component such as the matrix resin to maintain a low viscosity at the glue injection temperature, generally less than 500 mPa·s. In this way, the matrix resin can fully infiltrate and impregnate the support to prevent the occurrence of common defects in liquid molding such as delamination and poor glue, and obtain a composite material with higher performance.

For example, the first component includes at least one of a curing agent, a toughening agent, a promoter, and an initiator, and the second liquid component is a thermosetting resin or a thermoplastic resin.

For example, the thermosetting resin includes at least one of epoxy resin, bismaleimide resin, thermosetting polyimide resin, polybenzoxazine resin, phenolic resin, cyanate ester resin, and unsaturated polyester resin.

For example, the epoxy resin includes at least one of bisphenol A epoxy resin, bisphenol F epoxy resin, and N,N'-tetraglycidyl-methylenedianiline epoxy resin.

For example, the bismaleimide resin includes at least one of 4,4'-bismaleimidodiphenylmethane, 4,4'-bismaleimidodiphenyl ether, 4,4'-bismaleimidodiphenyl sulfone, N,N'-m-phenylenebismaleimide, N,N'-(4-methyl-1,3-phenylene)bismaleimide, and 2,2'-bis [4-(maleimidophenoxy)phenyl] propane.

For example, the thermoplastic resin includes methyl acrylate.

For example, the first component is a first loaded component which is a functional component, and the second liquid component is a matrix component.

For example, the functional component includes at least one of a curing agent, a toughening agent, a promoter, and an initiator.

For example, the toughening agent includes at least one of polyetherketone, polyaryletherketone, polysulfone, polyethersulfone, thermoplastic polyimide, polyetherimide, polycarbonate, polyphenylene ether, and polyamide. The toughening agent can improve the flexibility of the final product, so that the final product can be widely used in the structure of high temperature resistant primary and secondary bearing composite materials such as aerospace, weapon, and ship, thereby eliminating their usual problems of high brittleness and low impact toughness.

For example, the curing agent includes amines, acid anhydrides, and the like, such as diaminodiphenyl sulfone and rosin-based acid anhydride. The curing agent can be reacted with the reaction component to make the final product formed in a solid state.

For example, the promoter is a complex of boron trichloride and triethylamine, and the promoter can accelerate the reaction.

For example, the initiator includes benzoyl peroxide, which can initiate a chemical reaction, reduce the conditions under which the chemical reaction occurs, and make the chemical reaction proceed smoothly.

In the ex-situ preparation method provided by at least one embodiment of the present disclosure, for example, the porous support is a fiber-reinforced fabric, and the second liquid component is diallyl bisphenol A (DABPA); N,N'-m-phenylenebismaleimide (PDM) is dispersed in N,N'-dimethylacetamide (DMAC), and stirred to form a uniform PDM solution which is used as the first component.

For example, the first component is uniformly formed on a porous support, and air-dried to form a fabric preform loaded with PDM; multiple layers (for example, 10 layers) of the fabric preform loaded with PDM are placed into an RTM mold to make a preform board; it should be noted that this preform board still has good permeability, and the preform board is a porous preform board. Then, the second liquid component is injected into the preform board, and this process is the flow filling process of the liquid resin; at this time, an appropriate injection temperature is maintained, so as to avoid the chemical reaction between the first component and the second liquid component, while maintaining the fluidity of the second liquid component, for example, the injection temperature of the second liquid component is 60° C., the injection pressure of the second liquid component is 0.1 MPa, and the mold filling time of the second liquid component is from 2 to 3 hours. Finally, the preparation enters the chemical reaction curing stage, in which the fiber support preform loaded with PDM and completely impregnated with liquid DABPA is heated to 150° C.-200° C. at a heating rate of 1-3° C./min. At this time, the first component, i.e., PDM, is dissolved and diffused by the second liquid component, DABPA, and at the same time, a chemical curing reaction occurs to form a fiber-reinforced liquid-molded bismaleimide solid composite product.

For example, the solid product formed in the above process not only has high toughness, but also meets the process requirements for liquid molding of composite materials. The formed solid product has a high glass transition temperature, and can be widely used in the structure of high temperature resistant primary and secondary bearing composite materials such as aerospace, weapon, and ship.

For example, in the ex-situ preparation method provided by at least one embodiment of the present disclosure, the porous support is a reinforced fabric, and an epoxy resin formed by blending bisphenol A epoxy (DGEBA) and N,N'-tetraglycidyl-methylenedianiline epoxy (TGMDA) is used as the second liquid component, and diaminodiphenyl sulfone (DDS) as a curing agent is dissolved in methyl ethyl ketone (MEK) to form the first component; the first component is contacted with the porous support and air-dried to form a fabric preform loaded with DDS; multiple layers, for example, 12 layers of the fabric preform loaded with DDS are placed into a mold to make a preform laminate board while ensuring the porous characteristic of the preform laminate board; then, in the physical flow filling stage, the second liquid component is injected into the mold (that is, the flow filling and infiltrating process of the liquid resin), and at this time, an appropriate injection temperature is maintained to avoid the chemical reaction between the first loaded component and the second liquid component, thereby maintaining the flow property of the second liquid component; for example, the injection temperature of the second liquid component is 60° C., the injection pressure of the second liquid component is 0.1 MPa, and the mold filling time of the second liquid component is from 2 to 3 hours. Finally, the above porous support loaded with DDS and fully impregnated with DGEBA and TGMDA is heated to 180° C. at a heating rate of 0.5-0.7° C./min and kept for 2 hours; at this time, the first loaded component, i.e., DDS, is dissolved by the second liquid component, i.e., DGEBA and TGMDA, and at the same time, a chemical cross-linking reaction occurs to form a fiber-reinforced, liquid-molded, and toughened composite material as a solid.

In embodiments of the present disclosure, because the glue injection temperature is controlled, and the low viscosity requirement of the ex-situ liquid molding process for the long-term filling and long-distance flow of the second liquid component is met, the process has a good effect of infiltration and impregnation and is easy to operate so that the probability of defects is small, thereby reducing the production cost.

In addition, a pioneering application of the ex-situ preparation method provided in an embodiment of the present disclosure is toughening of liquid-molded composite materials, because a thermosetting matrix resin with low viscosity is usually brittle, and difficult to be toughened by adding a high-molecular-weight thermoplastic component. In this way, after completion of the physical flow filling of the second liquid component, the dispersion and diffusion of the thermoplastic polymer component as the first component pre-placed on the porous support in the thermosetting matrix resin can be initiated to form a homogeneous intermediate state of thermosetting/thermoplastic polymer, which is then further reacted to induce its spinodal phase separation and establish a bi-continuous toughened structure, thereby achieving the "ex-situ" toughening of the liquid-molded composite material.

For example, in the ex-situ preparation method provided by at least one embodiment of the present disclosure, the porous support is a reinforced fabric, and the rosin-based acid anhydride as a curing agent and the boron trichloride triethylamine as a promoter are mixed and dissolved in an acetone as a solvent to form the first component, and then, a mixed epoxy resin of E51 and bisphenol F is used as the second liquid component. The first component is contacted with the porous support, and air-dried to form a fabric preform loaded with the first component; multiple layers of the preform are placed into a mold, while maintaining the porous characteristic of the preform. Then, the preparation enters the physical filling stage, in which the second liquid component is injected into the mold under the following conditions: the temperature of the mold and the glue injection system is 80° C., and the glue injection time is 30-40 minutes; in this way, the chemical cross-linking reaction between the first component and the second liquid component during the glue injection process which causes the process to fail can be avoided. Finally, the preparation enters the chemical reaction curing stage, in which the above preform loaded with rosin acid anhydride and the promoter and fully impregnated with liquid epoxy is subjected to step-by-step heating treatment: heated to 100° C. and kept for 2 hours, then heated to 125° C. and kept for 1 hour, and then heated to 160° C. and kept for 1 hour, wherein the heating rate is 0.5-0.7° C./min; in this way, a fiber-reinforced liquid-molded epoxy resin solid composite product with high glass transition temperature and high performance is obtained.

For example, in the ex-situ preparation method provided by at least one embodiment of the present disclosure, the thermoplastic polyaryletherketone (PEK-C) is dissolved in a suitable solution, for example, dissolved in tetrahydrofuran (THF) to form a solution as the first component (functional component), and the porous support is a reinforced fabric, and the E54 epoxy resin is used as the second liquid component. The first component is printed on the fiber support to form regular spots; multiple layers of the preform loaded with PEK-C are placed into a mold, while ensuring the porous characteristic of the preform. Then, in the physical filling stage, the E54 epoxy resin as the second liquid component is injected into the mold, wherein the glue injection temperature is controlled to be 60° C., and the injection pressure is controlled to be 0.1 MPa, and the mold filling time is controlled to be 2-3 hours, so that the second liquid resin is ensured to not dissolve the PEK-C of the first component. Finally, in the curing stage, the porous support loaded with PEK-C and fully impregnated with liquid E54 epoxy resin is heated to 180° C. at a heating rate of 0.5-0.7° C./min and kept for 2 hours; at this time, the first component is dissolved by the second liquid component, i.e., E54 epoxy resin, and reaction-induced spinodal phase separation of PEK-C in the E54 epoxy resin occurs to form a thermoplastic-thermosetting bi-continuous toughened structure between layers of the composite material; and finally a fiber-reinforced, liquid-molded, and toughened composite solid is obtained.

For example, for some thermoplastic composite resins molded by bulk polymerization reaction, the liquid molding of composite materials can also be realized simply and easily by the "ex-situ" preparation method.

For example, in the ex-situ preparation method provided by at least one embodiment of the present disclosure, benzoyl peroxide (BPO) is dissolved in a solvent such as ethanol to form the first component, and the porous support is a reinforced fabric support, and the thermoplastic methyl acrylate (MMA) resin is used as the second liquid component. The first component is the first loaded component which is impregnated onto the porous support and air-dried to form a fabric preform. Multiple layers of the fabric preform loaded with BPO are placed into a mold to make a preform laminate board, while ensuring the porous characteristic of the preform. Then, in the flow filling stage, the second liquid component is injected into the mold, wherein the glue injection temperature is controlled to be about 25° C.-30° C., at which temperature the first loaded component is basically not reacted chemically with the second liquid component. Finally, in the chemical reaction stage, the above support loaded with BPO and fully impregnated with liquid MMA is heated to 80° C. at a heating rate of 0.5-0.7° C./min and kept for 1 hour; at this time, the first loaded component, i.e., BPO, is dissolved by the second liquid component, i.e., MMA, and the polymerization reaction of MMA occurs to form an ex-situ liquid-molded composite material of a bulk polymerized thermoplastic methyl methacrylate-based resin.

For example, in another embodiment, due to the high initial viscosity of an acid anhydride-cured epoxy resin, it is usually not suitable for liquid molding technology. However, through the ex-situ liquid molding technology in the embodiments of the present disclosure, its liquid molding can be realized.

The present disclosure will be further illustrated with the following examples.

Example 1

A 0°/45°/90°/−45° four-way woven glass cloth (a kind of reinforced fabric) with an area density of 820 g/m² was selected as a porous support. An epoxy system formed by blending bisphenol A epoxy (DGEBA) and N,N'-tetraglycidyl-methylenedianiline epoxy (TGMDA), which was commonly used in liquid resin transfer molding, was selected as a second liquid component, that is, a matrix resin, and diaminodiphenyl sulfone (DDS) was used as a first component (i.e., a curing agent) to prepare a liquid-molded epoxy resin composite material.

First, DDS was dispersed in a suitable solvent such as methyl ethyl ketone (MEK) or methyl isobutyl ketone (MIBK). According to the mass ratio of DGEBA, TGMDA, and DDS (DGEBA:TGMDA:DDS=40:60:34), the reinforced fabric was impregnated and loaded with the appropriate amount of DDS and air-dried to prepare a fabric preform.

The fabric preform loaded with the curing agent, DDS, was placed into a mold, and a total of 5 layers were laid to form a preform laminate board. According to the cavity volume of the mold and the area density of the fiber cloth, the volume content of fibers (Vf) in the composite material was 53.8%, and the thickness of the laminate board was 3 mm. The mold was sealed.

The viscosity characteristic of the mixed pure epoxy without a curing agent (DGEBA:TGMDA=40:60 according to the mass ratio) was tested. It was found that its viscosity in the temperature range of 100° C.-200° C. was extremely low, about 0.064 Pa·s, and very suitable for liquid molding technology. The viscosity-temperature characteristic was measured, and it was found that the low viscosity characteristic of the mixed epoxy resin can be maintained for 2 hours without change under the condition of 100° C. After extending the time to 6 hours, its low viscosity characteristic remained unchanged. This indicated that there was no problem with the implementation of "ex-situ" liquid molding. However, the resin viscosity of the epoxy system added with DDS as a curing agent (mass ratio DGEBA:TGMDA:DDS=40:60:34) increased rapidly.

Under the condition of 100° C./0.05 MPa, the mixed pure epoxy resin (DGEBA:TGMDA=40:60 by mass) was injected into the above mold, and the mold was kept in a vacuum state.

After the flow, infiltration, impregnation and mold filling of the above mixed epoxy resin were completed, that is, about 125 minutes later, the mold was heated to 180° C. at a heating rate of 0.5-0.7° C./min, and kept at 180° C. for 2 hours. In this process, the chemical cross-linking reaction was initiated. The temperature was then raised to 200° C. and maintained at 200° C. for 2 hours for curing. After the curing process was completed, the mold was cooled and opened, and the final ex-situ liquid molded composite material part was taken out. The molded part was found by visual inspection to be cured, and then no dry spots were found by ultrasonic scanning.

The mechanical properties of the "ex-situ" RTM injection molded glass fiber cloth reinforced composite laminate board were measured and compared with those of the board prepared with the conventional RTM process. The results were shown in the table below, and it can be seen that there is basically no difference between the two.

| Test items | Conventional RTM | "Ex-situ" RTM |
| --- | --- | --- |
| Volume content of fibers (%) | 53.8 | 53.8 |
| Tensile strength (MPa) | 300 | 283 |
| Tensile modulus (GPa) | 15.8 | 16.4 |
| Compressive strength (MPa) | 471 | 432 |
| Flexural strength (MPa) | 364 | 380 |
| Flexural modulus (GPa) | 14.2 | 18.1 |
| Interlayer shear (MPa) | 47.1 | 45.6 |

Apparently, compared with the traditional RTM liquid molding process, the advantage of the "ex-situ" RTM molded composite material lies in the theoretically "infinite" long open period of the low viscosity state (about 0.064 Pa·s) of the resin, which greatly reduces the difficulty of process operation and parameter control of the liquid molding, and also greatly saves production costs.

This example shows that although there is no mechanical mixing and homogenization of the multi-component matrix resin during the "ex-situ" liquid molding process, and only the dissolution and short-distance diffusion between the components are relied on, the structural properties of the final composite material do not change significantly, confirming the feasibility of the "ex-situ" liquid molding technology.

Example 2

A unidirectional carbon fiber reinforced fabric of model G827 was selected as a support. N,N'-m-phenylenebismaleimide monomer (PDM, solid) was used as a first component, and diallyl bisphenol A (DABPA, liquid) was used as a second liquid component to prepare a carbon fiber reinforced bismaleimide (BMI) resin-based composite material. The first component and the second liquid component were both reactive components. According to the molar ratio of maleimide to the allyl group of 1:0.87, the converted mass ratio of PDM to DABPA was 1:1.

The measured viscosity of liquid DABPA at 60° C.-70° C. was about 0.080 Pa·s, which was very suitable for the implementation of "ex-situ" RTM process.

First, PDM was dispersed in a strong polar solvent, N,N'-dimethylacetamide (DMAC), dioxane, or tetrahydrofuran. According to the formula of equal proportions and the conversion of the ratio of the resin content of the composite material, an appropriate amount of PDM solution was loaded on the reinforced fabric by impregnation, and air-dried to prepare a fabric preform.

Twelve layers of the above G827 carbon fiber cloth loaded with PDM on the surface were placed into an RTM mold to make a preform board. After conversion, the volume content Vf of the carbon fiber of the composite material was 55%. The mold was sealed.

The diallyl bisphenol A (DABPA) was injected into a mold with a temperature of 60° C. at an injection pressure of 0.1 MPa. The mold was vacuumized by suction, and the mold filling time was 2-3 hours. During this process, it can be observed that the PDM solid was gradually dispersed in the DABPA liquid.

It was kept at 150° C., 180° C. and 200° C. for 1 hour, 4 hours, and 4 hours respectively to allow the chemical reaction to occur to form a solid product, and the rate of temperature rise was 1-3° C./min.

Finally, the mold was cooled and opened, and the solid composite material part was taken out. The molded part was found by visual inspection to be cured, and then no dry spots were found by ultrasonic scanning.

The mechanical properties of the "ex-situ" RTM injection molded carbon fiber reinforced BMI composite laminate board were measured and compared with those of the board prepared with the conventional RTM process. The results were shown in the following table, and it can be seen that there is basically no difference between the two.

| Test items | Conventional RTM | "Ex-situ" RTM |
| --- | --- | --- |
| Volume content of fibers (%) | 55 | 55 |
| Flexural strength (MPa) | 1730 | 1740 |
| Flexural modulus (GPa) | 125 | 115 |
| Shear strength (MPa) | 92 | 98 |

Compared with the composite part with a flow distance of 340 mm in this example, the "ex-situ" RTM molded BMI composite material is characterized by its long-term low viscosity (about 0.080 Pa·S) at a lower injection system temperature (70° C.), while the traditional RTM injection temperature of the BMI must be above 130° C. Apparently, the lower temperature of the glue injection system can save production costs.

It should be noted that the example of the "ex-situ" liquid molding requires a longer injection time (2-3 hours) because the first component and the second liquid component are not mechanically mixed, while the high-temperature injection time of traditional RTM is shorter, about 40-50 minutes. Of course, the longer time facilitates the operation and control of the process.

Example 3

A carbon fiber plain fabric was used as a support. A mixed epoxy resin of E51 and bisphenol F was used as a second liquid component (a reactive component). A rosin-based acid anhydride was used as a curing agent, and the complex of boron trichloride and triethylamine was used as a promoter, wherein a mixture of the rosin-based acid anhydride and the complex of boron trichloride and triethylamine was used as a first loaded component to prepare an epoxy resin composite material through ex-situ liquid molding. The total of the curing agent and the promoter was about 30-40 parts by mass, that is, 30-40 parts by mass of the curing agent and the promoter were used for 100 parts by mass of resin.

Rosin anhydride was dispersed in acetone as a solvent at a mass percentage of 3%, sprayed on a support formed by the carbon fiber plain fabric, and then air-dried. Nine layers of the carbon fiber plain fabric loaded with rosin anhydride were laid in an RTM mold. The mold was sealed. The volume fraction of fibers of the composite material was controlled to be 60% by controlling the thickness gap of the mold, wherein the larger the gap, the lower the volume fraction of fibers.

The mixed epoxy resin of E51 and bisphenol F was injected into the mold at a temperature of 80° C. The mold was vacuumized by suction, the injection pressure of the second liquid component was 0.05-0.4 MPa, and the mold filling time was 30-40 minutes.

It was kept at 100° C., 125° C., and 160° C. for 2 hours, 1 hour, and 1 hour respectively to allow the chemical reaction to occur to form a solid product.

Finally, the mold was cooled and opened, and the composite material part was taken out. The molded part was found by visual inspection to be cured, and then no dry spots were found by ultrasonic scanning.

The mechanical properties of the "ex-situ" RTM injection-molded carbon fiber reinforced anhydride-cured epoxy resin composite laminate board were measured. The flexural strength was 734 MPa. The interlayer shear strength was 48.6 MPa. The glass transition temperature of the composite material measured by the Dynamic Mechanical Analysis (DMA) was 179° C.

The characteristic of this example is that the viscosity of acid anhydride-cured epoxy resins is too high to be applied to liquid molding technology so far, however the "ex-situ" technology in the example can be used to inject the acid anhydride-cured epoxy resin and obtain good mechanical properties of the composite material. Therefore, the choice and type of liquid molding resins are expanded, so that resins that cannot be used for liquid molding according to traditional techniques can also be used for liquid molding.

Example 4

An epoxy system formed by blending bisphenol A epoxy (DGEBA) and N,N'-tetraglycidyl-methylenedianiline epoxy (TGMDA) was used as the second liquid component, namely the matrix resin, and diaminodiphenyl sulfone (DDS) was used as the first component (i.e., a curing agent) to prepare "ex-situ" toughened liquid-molded epoxy resin composite materials.

G827 carbon fiber fabric was impregnated with tetrahydrofuran (THF) Immediately afterwards, a polyether ketone (PEK-C) powder as a thermoplastic toughening agent was scattered on the surface of the G827 carbon fiber fabric by vibration. The PEK-C powder was slightly soluble in tetrahydrofuran and loaded on the surface of the G827 carbon fiber fabric. In this process, in order to prevent the flow channel of the liquid-molding resin from being blocked, it was necessary to ensure that the PEK-C loaded on the surface of the G827 carbon fiber fabric cannot be connected into a sheet or form a continuous surface film.

Then, the fabric loaded with PEK-C was cut out, laid and assembled into a preform, and then placed into a mold.

The liquid molding resin was formulated according to the mass ratio of DGEBA:TGMDA:DDS=40:60:34, injected into the mold with a VARI process, and cured according to the standard curing process of the resin to obtain the required composite laminate board with a volume fraction of carbon fibers of 55%.

Finally, the mold was cooled and opened, and the composite material part was taken out. The molded part was found by visual inspection to be cured, and then no dry spots were found by ultrasonic scanning.

The Compression After Impact (CAI) of the composite material was measured. It was found that the CAI was increased by about 170% compared with the composite material that was not "ex-situ" toughened.

Example 5

Polyether ketone (PEK-C) as a thermoplastic toughening agent was dissolved in tetrahydrofuran (THF) to prepare a solution with a mass percentage of 20%. The solution was printed on a G827 unidirectional carbon fiber fabric on a gravure printing machine to form the specified pattern. The area density was controlled to be 15 g/m$^2$ by designing the groove depth and pattern. The preformed fabric with "a patterned load on the surface" was obtained by flattening with a hot roller at 80° C.

E54 epoxy resin was selected as the second liquid component to prepare the "ex-situ" molded toughened composite material. The CAI of the composite material was measured, and it was found that the CAI was increased by about 150% compared with the composite material that was not "ex-situ" toughened.

Example 6

A polyetherimide (PEI) resin powder was added as a toughening agent to water in which an emulsifier and a thickener had been dissolved to prepare a slurry with a viscosity of about 10000 cP and a solid content of 35%. The slurry was applied onto the G827 unidirectional carbon fiber fabric through a mask by a dot coating machine, and then shaped by being baked at a high temperature of 380° C. A preformed fabric with a patterned load on the surface was thus obtained.

The preformed fabric thus obtained was cut out, laid and assembled into a preform, and placed into a mold.

Bismaleimide (BMI) was used as the matrix resin, injected into the mold using an RTM process, and cured in accordance with the standard curing process of the resin system to obtain an "ex-situ" toughened liquid molding composite laminate board with a volume fraction of carbon fibers in the composite material of about 52%.

Finally, the mold was cooled and opened, and the composite material part was taken out. The molded part was found by visual inspection to be cured, and then no dry spots were found by ultrasonic scanning.

The CAI of the composite material was measured. It was found that the CAI was increased by about 140% compared with the composite material that was not "ex-situ" toughened.

Example 7

Glass cloth reinforced fabric was selected as a support, and liquid methyl acrylate (MMA) was selected as a second liquid component, that is, the matrix resin of the composite material, and benzoyl peroxide (BPO) was used as an initiator. First, BPO was dispersed in a suitable aqueous solvent, sprayed on the reinforced fabric, and air-dried to prepare a fabric preform. The glass cloth loaded with the initiator, BPO, on the surface was then pre-shaped and placed into a mold, wherein a total of five layers were laid, to form a preform laminate board. The mold was sealed.

Using the VARI process, the MMA liquid resin was vacuum sucked into the preform at room temperature. After the vacuum suction casting, flow, infiltration and impregnation were completed, the temperature was increased to 80° C. and kept for 1 hour, and then the MMA bulk polymerization was thermally initiated to form a solid product.

Finally, the mold was cooled and opened, and the composite material part was taken out. The molded part was found by visual inspection to be cured, and then no dry spots were found by ultrasonic scanning.

The mechanical properties of the "ex-situ" RTM injection-molded thermoplastic acrylic composite laminate board were measured and compared with those of a board prepared with the conventional RTM process. There was basically no difference between the two.

The ex-situ preparation method of a liquid molded composite material provided by at least one example of the present disclosure has at least one of the following beneficial effects:

(1) In the ex-situ preparation method provided by at least one example of the present disclosure, the characteristic of stable low viscosity of a liquid resin under independent existence condition is cleverly used; and through the separation in time sequence and spatial position, the liquid molding operation of high-performance composite materials is simply and easily realized, which is the so-called "ex-situ" liquid molding.

(2) In the ex-situ preparation method provided by at least one example of the present disclosure, the step of contacting the first component with the porous support can be completed in advance, so that the ex-situ liquid molding process is simplified and the porous support loaded with the first component can be completed mechanically and in batches.

(3) In the preparation method provided in at least one example of the present disclosure, no chemical reaction occurs during the physical flow filling of the second liquid component because the physical process and the chemical reaction process are separated in time sequence; its "open period" at this temperature is basically equivalent to the storage period of the second liquid component in principle, and thus its physical flow time can be prolonged, reducing process requirements.

(4) In the preparation method provided by at least one example of the present disclosure, the stable low viscosity characteristic of the second liquid component facilitates the low-pressure and long-distance flow of resin in large-scale, high-fiber volume fraction composite material products; the low-pressure and long-distance flow means that the cost of liquid molding manufacturing technology is reduced.

(5) In the preparation method provided by at least one example of the present disclosure, the second liquid component has a stable low viscosity, so that the common quality defects such as "lack of glue" and "dry spots" in the liquid molding process can be effectively suppressed, and the control of the molding process becomes simple.

(6) In the preparation method provided in at least one example of the present disclosure, the liquid molded thermosetting composite material can be toughened by reaction-induced spinodal phase separation of the thermoplastic component, and the liquid molded composite material can be obtained by bulk polymerization of the thermoplastic resin.

It should be noted that the embodiments of the present disclosure and the features in the embodiments can be combined with each other to obtain new embodiments in the case of no conflict.

The above are only specific embodiments of the present disclosure, but the protection scope of the present disclosure is not limited thereto. The protection scope of the present disclosure should be determined by the appended claims.

What is claimed is:

1. An ex-situ preparation method of a liquid-molded composite material, comprising:
providing a porous support, a first component and a second liquid component;
contacting the first component with the porous support;
contacting the second liquid component with the first component and/or the porous support, in which process the first component and the second liquid component do not undergo a chemical reaction, and the second liquid component remains in a liquid state; and treating the first component and the second liquid component such that the first component and the second liquid component undergo a chemical reaction to become a solid, or undergo phase transformation toughening and solidification molding, wherein the porous support is a reinforced fabric, and an epoxy resin formed by blending bisphenol A epoxy (DGEBA) and N,N'-tetraglycidyl-methylenedianiline epoxy (TGMDA) is used as a second liquid component, and diaminodiphenyl sulfone (DDS) as a curing agent is dissolved in methyl ethyl ketone (MEK) and used as a first component;

the first component is contacted with the porous support, and air-dried to form a fabric preform loaded with DDS;

placing multiple layers of the fabric preform loaded with DDS into a mold to make a preform laminate board, while ensuring the porous characteristic of the preform laminate board;

then, in the physical flow filling stage, injecting the second liquid component into the mold, wherein the injection temperature of the second liquid component is controlled to be 60° C., the injection pressure of the second liquid component is controlled to be 0.1 MPa, and the mold filling time of the second liquid component is controlled to be 2-3 hours, so that the first component is not chemically reacted with the second liquid component; and heating the above porous support loaded with DDS and fully impregnated with liquid DGEBA and TGMDA to 180° C. at 0.5-0.7° C./min, and kept for 2 hours, in which process the DDS first component is dissolved by the DGEBA and TGMDA second liquid component and at the same time, a chemical crosslinking reaction occurs to form a fiber-reinforced liquid-molded epoxy resin solid composite material product.

2. The ex-situ preparation method according to claim 1, wherein the first component is formed on the surface of the porous support in a dispersed form.

3. The ex-situ preparation method according to claim 2, wherein the porous support comprises carbon fiber, glass fiber, aramid fiber, basalt fiber, or a blend of the foregoing fibers; or the porous support includes unidirectional fabric, plain fabric, satin fabric, twill fabric, non-weft fabric, non-woven fabric, or non-crimp fabric.

4. The ex-situ preparation method according to claim 1, wherein the mass ratio of the first component to the second liquid component is from 2 to 50.

* * * * *

UNITED STATES PATENT AND TRADEMARK OFFICE
CERTIFICATE OF CORRECTION

PATENT NO. : 12,194,694 B2  
APPLICATION NO. : 16/972761  
DATED : January 14, 2025  
INVENTOR(S) : Xiaosu Yi et al.

Page 1 of 1

It is certified that error appears in the above-identified patent and that said Letters Patent is hereby corrected as shown below:

On the Title Page

Item (73) should read:
(73) Assignees: NINGBO NOTTINGHAM NEW MATERIALS INSTITUTE CO., LTD., Zhejiang (CN); THE UNIVERSITY OF NOTTINGHAM NINGBO CHINA, Zhejiang (CN); BEIJING MEGA MATERIAL INNOVATION WORK (M2IW) CO., LTD., Beijing (CN)

Signed and Sealed this  
Twentieth Day of May, 2025

Coke Morgan Stewart  
*Acting Director of the United States Patent and Trademark Office*